United States Patent
Hotta et al.

(10) Patent No.: US 9,876,220 B2
(45) Date of Patent: Jan. 23, 2018

(54) ELECTRODE FOR NON-AQUEOUS ELECTROLYTIC BATTERY, NON-AQUEOUS ELECTROLYTIC SECONDARY BATTERY, AND BATTERY PACK

(71) Applicant: Kabushiki Kaisha Toshiba, Minato-ku (JP)

(72) Inventors: Yasuyuki Hotta, Tokyo (JP); Takashi Kuboki, Tokyo (JP); Tomokazu Morita, Chiba (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 185 days.

(21) Appl. No.: 14/210,747

(22) Filed: Mar. 14, 2014

(65) Prior Publication Data

US 2014/0295248 A1    Oct. 2, 2014

(30) Foreign Application Priority Data

Mar. 26, 2013 (JP) .................. 2013-064012
Feb. 26, 2014 (JP) .................. 2014-035788
Mar. 13, 2014 (JP) .................. 2014-050611

(51) Int. Cl.

| | | |
|---|---|---|
| *H01M 4/13* | (2010.01) | |
| *H01M 4/62* | (2006.01) | |
| *H01M 4/131* | (2010.01) | |
| *H01M 4/133* | (2010.01) | |

(Continued)

(52) U.S. Cl.

CPC ............. *H01M 4/13* (2013.01); *H01M 4/622* (2013.01); *H01M 4/131* (2013.01); *H01M 4/133* (2013.01); *H01M 4/134* (2013.01); *H01M 10/052* (2013.01)

(58) Field of Classification Search

CPC ........ H01M 4/13; H01M 4/622; H01M 4/131; H01M 4/133; H01M 4/134; H01M 10/052

See application file for complete search history.

(56) References Cited

U.S. PATENT DOCUMENTS 6,423,447 B1 * 7/2002 Ohsaki .................. H01M 4/131
                                                   29/623.1
2003/0035995 A1    2/2003 Ohsaki et al.
(Continued)

FOREIGN PATENT DOCUMENTS

JP    2000-268872    9/2000
JP    2004-119176    4/2004
(Continued)

OTHER PUBLICATIONS

U.S. Appl. No. 14/210,775, filed Mar. 14, 2014, Hotta, et al.
(Continued)

*Primary Examiner* — Helen O Conley
(74) *Attorney, Agent, or Firm* — Oblon, McClelland, Maier & Neustadt, L.L.P.

(57) ABSTRACT

An electrode has a current collector and an electrode mixture containing a binder and an active material particle selected from at least one of a carbonaceous material, a metal particle and a metal oxide particle formed on the current collector. When cutting strength of an interface between the current collector and the electrode mixture is represented by "a" and cutting strength in a horizontal direction within the electrode mixture is represented by "b", the "a" and "b" satisfy a relation of a/b>1.

14 Claims, 4 Drawing Sheets

(51) Int. Cl.
  *H01M 4/134* (2010.01)
  *H01M 10/052* (2010.01)

(56) References Cited

U.S. PATENT DOCUMENTS

2003/0049535 A1* 3/2003 Ohta .................. H01M 4/133
                                                    429/231.8
2004/0115535 A1    6/2004 Morita et al.
2012/0214063 A1    8/2012 Morimoto et al.

FOREIGN PATENT DOCUMENTS

| JP | 2008/27633    | 2/2008 |
| JP | 2009-170384   | 7/2009 |
| JP | 2013-109853   | 6/2013 |
| WO | WO 2011/058981 | 5/2011 |

OTHER PUBLICATIONS

Combined Office Action and Search Report dated Dec. 3, 2015 in Chinese Patent Application No. 201410098010.3 with English translation.

* cited by examiner

ELECTRODE FOR NON-AQUEOUS ELECTROLYTIC BATTERY, NON-AQUEOUS ELECTROLYTIC SECONDARY BATTERY, AND BATTERY PACK

CROSS-REFERENCE TO RELATED APPLICATION

This application is based upon and claims the benefit of priority from Japanese Patent Applications No. 2013-064012 Mar. 26, 2013, No. 2014-035788 Feb. 26, 2014 and No. 2014-050611 Mar. 13, 2014; the entire contents of which are incorporated herein by reference.

FIELD

Embodiments described herein relate generally to an electrode for non-aqueous electrolytic battery, a non-aqueous electrolytic secondary battery, and battery pack.

BACKGROUND

In recent years, with rapid development of a size reduction technique for electronic equipment, a variety of types of mobile electronic equipment are becoming widespread. Then, batteries which are power sources of the mobile electronic equipment are also required to be reduced in size, and a non-aqueous electrolytic secondary battery with a high energy density is attracting attention.

A non-aqueous electrolytic secondary battery using metal lithium as a negative electrode active material has a very high energy density, but it deposits a dendroid crystal called "dendrite" on a negative electrode to make a battery life short, and has a safety problem such as a problem of dendrite growing and reaching a positive electrode to cause an internal short circuit. Hence, as a negative electrode active material in place of metal lithium, a carbon material that occludes and desorbs lithium, especially graphite carbon, has come to be used.

Further, an attempt has been made to especially use, as a negative electrode active material that seeks for a still higher energy density, an element to be alloyed with lithium such as silicon or tin, or a material having a large lithium occlusion capacity and a high density such as amorphous chalcogenide. Among them, silicon is capable of occluding lithium up to a ratio of a silicon atom to a lithium atom being 1:4.4, and a capacity of the negative electrode per mass is about ten times as large as that of graphite carbon. However, silicon makes a large change in volume which accompanies insertion and desorption of lithium in a charge and discharge cycle, and hence silicon has a problem with a cycle life, such as pulverization of an active material particle.

DETAILED DESCRIPTION

An electrode for non-aqueous electrolytic battery includes a current collector and an electrode mixture containing a binder and an active material particle selected from at least one of a carbonaceous material, a metal particle and a metal oxide particle formed on the current collector. When cutting strength of an interface between the current collector and the electrode mixture is represented by "a" and cutting strength in a horizontal direction within the electrode mixture is represented by "b", the "a" and "b" satisfy a relation of a/b>1.

Hereinafter, embodiments will be described.

(First Embodiment)

Figure 1:
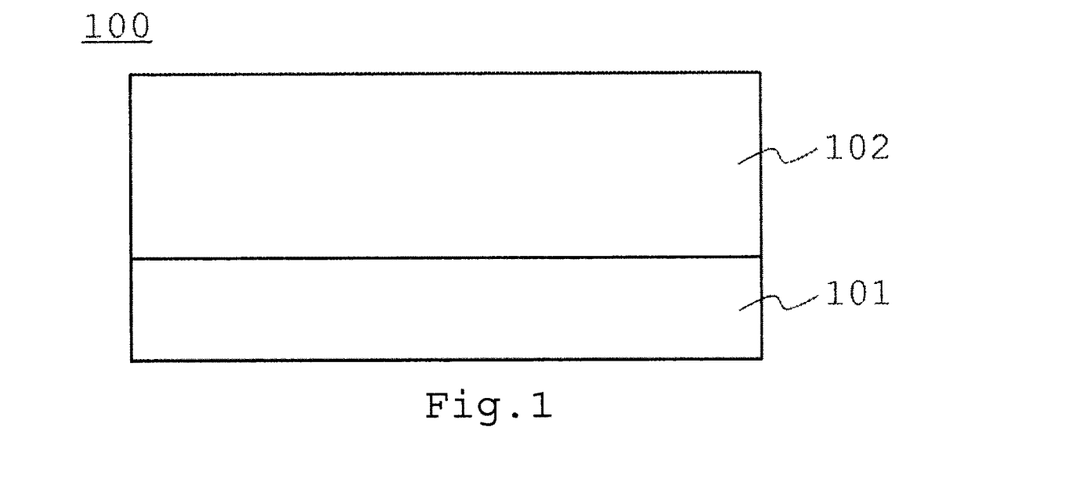
FIG. 1 is a conceptual view of a negative electrode of an embodiment.

A negative electrode of a first embodiment has a structure in which a negative electrode mixture containing a negative electrode active material is supported on one surface or each surface of a negative electrode current collector. FIG. 1 shows a sectional conceptual view of the negative electrode of the first embodiment. A negative electrode 100 of FIG. 1 is configured of a current collector 101 and a negative electrode mixture 102 formed on one surface of the current collector 101. The electrode of the embodiment may be used in various type of battery. The electrode of the embodiment may be also used for a positive electrode.

The negative electrode mixture 102 of the first embodiment is configured of a negative electrode active material and a binder. An additive agent such as a conductive agent may be contained in the negative electrode mixture 102.

A thickness of the negative electrode mixture 102 is preferably in a range of not smaller than 1.0 µm and not larger than 150 µm. Therefore, when the negative electrode mixture 102 is supported on each surface of the current collector 101, it has a total thickness in a range of not smaller than 2.0 µm and not larger than 300 µm. A preferable range for the thickness thereof on one surface is not smaller than 20 µm and not larger than 100 µm. When the thickness is in this range, a large current discharge characteristic and a cycle life are significantly improved.

A preferable blending ratio of the active material, the conductive agent and the binder of the negative electrode mixture 102 is: the active material being in a range of not less than 80 mass % and not more than 95 mass %; the conductive agent being in a range of not less than 3 mass % and not more than 18 mass %; and the binder being in a range of not less than 2 mass % and not more than 7 mass %. These ranges are preferable because favorable large current discharge characteristic and cycle life can be obtained.

As the negative electrode active material in the first embodiment, metal lithium, a lithium alloy, carbonaceous materials capable of occluding and releasing lithium [cokes, graphite, (natural graphite, artificial graphite, etc.), pyrolytic carbons, sintered compacts of organic polymer compounds, carbon fibers, activated carbon], and at least one of one or more selected elements which are selected from Si, Sn, Al, In, Ga, Pb, Ti, Ni, Mg, W, Mo and Fe, an alloy including one or more the selected elements, an oxide of one or more the selected elements, and an oxide including one or more the selected elements, and the like are used singly or in combination of two or more of them. The alloy may also include other metal element.

Among them, a desirable aspect of the negative electrode active material according to the first embodiment is a particle including a complex dispersed in a carbonaceous material in the state of being contained or retained in a silicon oxide phase where microcrystal Si is strongly bound with Si in an active material obtained by making fine silicon monoxide compound with a carbonaceous material and sintering it, as well as a particle which is obtained by these being finely compounded. Further, the silicon oxide phase retaining and containing Si preferably has an average size of not smaller than 50 nm and not larger than 1000 nm and exists as having been distributed in the carbonaceous material in a uniform state where a value of (standard deviation/average size) is not larger than 1.0 in a standard deviation with a size distribution defined by (d84%−d16%)/2.

The silicon phase inserts and desorbs a large amount of lithium, to greatly increase the capacity of the negative electrode active material. Expansion and shrinkage of the silicon phase due to insertion and desorption of a large amount of lithium is alleviated by dispersing the silicon phase in the silicon oxide phase and the carbonaceous material to prevent pulverization of the active material particle, while the carbonaceous material phase ensures conductivity which is important as the negative electrode active material, and the silicon oxide phase is strongly bound with silicon and has a large effect on maintenance of a particle structure as a buffer for retaining silicon having been made fine.

The silicon phase greatly expands and shrinks at the time of occluding and releasing lithium, and in order to alleviate this stress, the silicon phase is preferably dispersed as having been made as fine as possible. Specifically, it is preferably dispersed with a size ranging from a several nm cluster to not larger than 100 nm at the maximum.

While the silicon oxide phase takes a structure of amorphous, crystalline or the like, it is preferably dispersed in the active material particle uniformly in the form of being bound with the silicon phase and including or retaining this. However, as the microcrystals Si retained in this silicon oxide repeatedly occlude and release Li at the time of charge and discharge, they are mutually bound to grow a crystallite size, thus causing reduction in capacity and deterioration in initial charge and discharge efficiency. Accordingly, in the present aspect, the size of the silicon oxide phase is made small and uniform, to hinder the growth of the crystallite size of the microcrystal Si, thereby suppressing capacity deterioration due to the charge and discharge cycle and improving the life characteristic. A preferably average size of the silicon oxide phase is in a range of 50 nm to 1000 nm. It is to be noted that a size of the phase is a value of a diameter at the time of conversion to a circle corresponding to an area of a cross section of the phase. When the average size is larger than this range, the effect of suppressing the growth of size of the microcrystal Si cannot be obtained. Further, when it is smaller than this range, dispersion of the silicon oxide phase becomes difficult at the time of producing the active material, and there also occurs problem such as deterioration in rate characteristic and deterioration in initial charge and discharge capacity efficiency due to deterioration in conductivity as the active material. The average size is further preferably not smaller than 100 nm and smaller than 500 nm, and when it is in this range, a particularly favorable life characteristic can be obtained. Moreover, in order for the active material as a whole to obtain favorable life characteristics, the size of the silicon oxide phase is preferably uniform. When a 16% cumulative diameter at a volume fraction is represented by d16% and a 84% cumulative diameter at a volume fraction is represented by d84%, with respect to a standard deviation represented by (d84%−d16%)/2, a value of (standard deviation/average size) is preferably not larger than 1.0, and moreover, when it is not larger than 0.5, an excellent life characteristics can be obtained.

The carbonaceous material obtained by being made to compound with the silicon phase and the silicon oxide phase inside the particle is favorably graphite, hard carbon, soft carbon, amorphous carbon, acetylene black or the like, and is made up of one or a few of those, preferably graphite alone or a mixture of graphite and hard carbon. Graphite is preferable in terms of enhancing the conductivity of the active material, and has a large effect in covering the whole hard carbon active material and alleviating expansion and shrinkage. The carbonaceous material is preferably formed in the shape of containing the silicon phase and the silicon oxide phase. Further, in the complex where the particulate silicon oxide phase is dispersed, a carbon fiber is preferably contained so as to retain the particle structure, prevent condensation of the silicon oxide phase and ensure the conductivity. Hence it is effective when a diameter of the added carbon fiber is a size approximately the same as that of the silicon oxide phase, and an average size is preferably not smaller than 50 nm and not larger than 1000 nm, and particularly preferably not smaller than 100 nm and not larger than 500 nm. A content of the carbon fiber is preferably not less than 0.1 mass % and not more than 8 mass %, and particularly preferably not less than 0.5 mass % and not more than 5 mass %

Further, lithium silicate such as $Li_4SiO_4$ may be dispersed on the surface or the inside of the silicon oxide phase. It is thought that performing heat treatment on lithium salt added to the carbonaceous material causes a solid reaction with the silicon oxide phase within the complex, to form lithium silicate.

A $SiO_2$ precursor and a Li compound may be added into the carbonaceous material having the structure of covering the silicon phase and the silicon oxide. Adding these materials into the carbonaceous material strengthens the bond between the carbonaceous material and $SiO_2$ generated from silicon monoxide, and also generates in the silicon oxide phase $Li_4SiO_4$ excellent in Li-ion conductivity. Examples of the $SiO_2$ precursor include alkoxide such as silicon ethoxide. Examples of the Li compound include lithium carbonate, lithium oxide, lithium hydroxide, lithium oxalate and lithium chloride.

A particle diameter of the negative electrode active material is preferably not smaller than 5 μm and not larger than 100 μm, and a specific surface area thereof is preferably not smaller than 0.5 $m^2$/g and not larger than 10 $m^2$/g. Each of the particle diameter and the specific surface area of the active material has an effect on a speed of insertion and desorption reactions of lithium and has a large effect on the negative electrode characteristics, but with a value in this range, the characteristics can be stably exerted.

Further, a full width at half maximum of a diffraction peak of the Si (220) plane in a powder X-ray diffraction measurement for the active material is preferably not smaller than 1.50 and not larger than 8.0°. The full width at half maximum of the diffraction peak of the Si (220) plane becomes smaller as s crystal grain of the silicon phase grows larger, and when the crystal grain of the silicon phase grows larger, cracking and the like tend to occur in the active material particle, accompanying expansion and shrinkage due to insertion and desorption of lithium. However, when the full width at half maximum is within the range of not smaller than 1.50 and not larger than 8.0°, it is possible to avoid such a problem coming to the surface.

A ratio of the silicon phase, the silicon oxide phase and the carbonaceous material phase is preferably that a molar ratio of Si and carbon is in a range of 0.2≤Si/carbon≤2. The quantitative relation between the silicon phase and the silicon oxide phase is desirably that the molar ratio is 0.6≤Si/$SiO_2$≤1.5 because it is possible to obtain a large capacity and a favorable cycle characteristic s as the negative electrode active material.

Further, the negative electrode mixture 102 may contain the conductive agent. Examples of the conductive agent may include acetylene black, carbon black and graphite.

As the current collector 101, there can be used a conductive substrate with a porous structure or a nonporous conductive substrate. These conductive substrates can be formed of copper, stainless or nickel, for example. A thickness of the current collector 101 is desirably from not smaller than 5 µm and not larger than 20 µm. This is because, with this range, the balance between the electrode strength and weight saving can be taken. Among these substrates, copper containing a copper alloy is most preferable in terms of the conductivity.

The negative electrode mixture 102 contains the binder for binding the negative electrode materials to each other. As the binder, for example, there can be used polytetrafluoroethylene (PTFE), polyvinylidene difluoride (PVdF), polyacrylic acid, alginic acid, polysaccharides such as cellulose, and derivatives thereof, an ethylene-propylene-diene copolymer (EPDM), styrene-butadiene rubber (SBR), polyimide, polyamide, polyamideimide and the like. Among these, a polymer having imide groups such as polyimide is preferable from the viewpoint of large binding strength of the current collector and the negative electrode materials. Further, two or more of the above may be used in combination for the binder, and the negative electrode 100 excellent in life characteristic can be produced when a binder excellent for binding the active materials to each other and a binder excellent for binding the active material and the current collector 101 are used in combination or when one with high hardness and one with high flexibility are used in combination.

At the time of these members constituting the negative electrode 100, when the cutting strength of the interface between the current collector 101 and the negative electrode mixture 102 is represented by a [kN/m] and the cutting strength in an arbitrary horizontal direction within the negative electrode mixture 102 is represented by b [kN/m], the negative electrode is produced such that a/b>1 holds. That is, design is made in the direction of improving adhesion of the interface between the current collector 101 and the negative electrode mixture 102. Therefore, the binder concentration in the negative electrode 100 is distributed so as to be higher on the current collector 101 side. With such a configuration formed, volume expansion which accompanies charge and discharge can prevent separation of the current collector 101 and the negative electrode mixture 102 from each other, thereby to improve the cycle characteristic. Then, the binder on the opposite surface of the negative electrode mixture 102 to the current collector 101 is made small in amount, to alleviate stress of volume expansion and further not to increase a total amount of the binder, and hence a high charge and discharge capacity can be maintained. For the above reason, a/b>1.2 is more preferable, and a/b>1.3 is further more preferable. It is to be noted that a preferable maximum value of a/b is 3.0 from the viewpoint of maintaining the binding strength between the negative electrodes. The current collector surface may be treated to enhance adhesion to the electrode mixture.

In addition, as a method for evaluating the cutting strength a of the interface between the current collector 101 and the negative electrode mixture 102 and the cutting strength b in the arbitrary horizontal direction within the negative electrode mixture 102, there is a test in SAICAS (Surface And Interfacial Cutting Analysis System). This is a technique of performing cutting with a fine and sharp cutting blade while controlling a depth position thereof with respect to the sample surface, to measure stress that is applied on the blade. A cutting measured value of the interface between the current collector 101 and the negative electrode mixture 102 includes friction resistance due to the cutting blade coming into contact with the surface of the current collector 101. The cutting strength a is to be a value obtained by subtracting the friction resistance from the cutting measured value of the interface of the negative electrode mixture 102. The cutting strength a of the interface between the current collector 101 and the negative electrode mixture 102 can be measured by fixing the depth position of the blade to the interface. At this time, a constant required load is applied on the cutting blade in a current collector 101 direction. The constant required load is force of the tip of the cutting blade being kept abutting the interface between the negative electrode mixture 102 and the current collector 101, and the cutting (separation) strength a of the negative electrode mixture 102 with respect to the current collector 101 is calculated. Further, the cutting strength b in the arbitrary horizontal direction within the negative electrode mixture 102 can be measured by fixing a height of the cutting blade within the electrode mixture to a constant required height. The height at this time is based on a distance from the current collector 101. In the embodiment, the cutting strength b is to be measured in a region half as large as an average thickness of the electrode mixture. The region half as large as the average thickness of the electrode mixture is a region within ±20% of the average thickness of the negative electrode mixture from the surface of the negative electrode mixture 102. A moving speed of the cutting blade is to be a required constant speed.

Here, friction resistance to be used in calculating the cutting strength a is resistance force that is generated when only the current collector is prepared and the cutting blade is moved over the surface thereof with the same load as the one set at the time of measuring the cutting strength a.

Further, each of the cutting strengths a, b is to be an average value of strength measured for 200 seconds after the lapse of 10 seconds from arrival of the cutting blade at the set depth. The measurement is performed in a region except for the end of the electrode. It is preferable to perform the measurement at least three places, and use an average value of the respective measurement results. It is to be noted that a temperature of the sample in analysis is, for example, a room temperature. Each sample is preferably measured at the same temperature.

The thickness of the negative electrode mixture 102 can be measured with ease by use of a contact-type thickness measuring device such as a linear gauge sensor, or the like. The thickness of the mixture can be measured by subtracting the thickness of the current collector 101 alone from the measured thickness of the electrode.

(Second Embodiment)

A non-aqueous electrolytic secondary battery according to a second embodiment will be described.

The non-aqueous electrolytic secondary battery according to the second embodiment is provided with: an exterior member; a positive electrode housed in the exterior member; a separator housed in the exterior member; a negative electrode containing an active material and housed in the exterior member as spatially separated from the positive electrode, for example via the separator; and a non-aqueous electrolyte with which the exterior member is filled.

Figure 2:
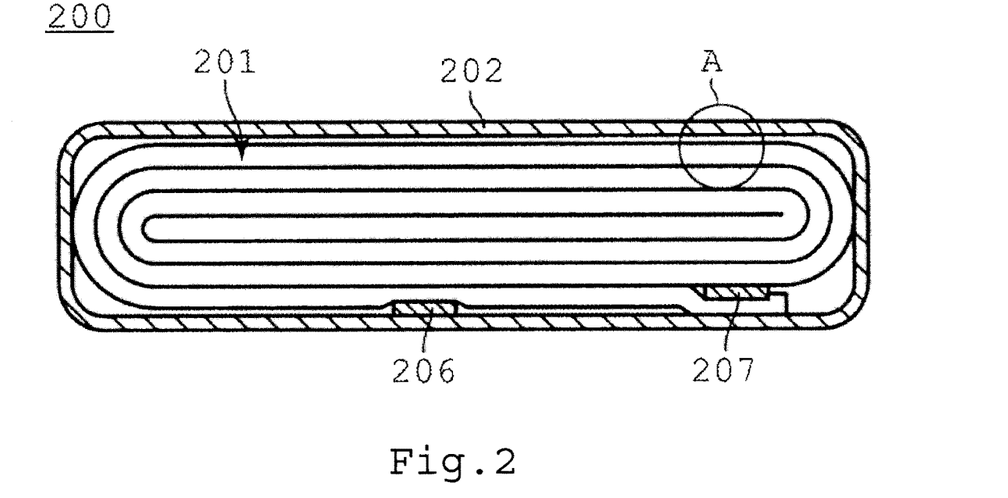
FIG. 2 is a conceptual view of a non-aqueous electrolytic secondary battery of the embodiment.
Figure 3:
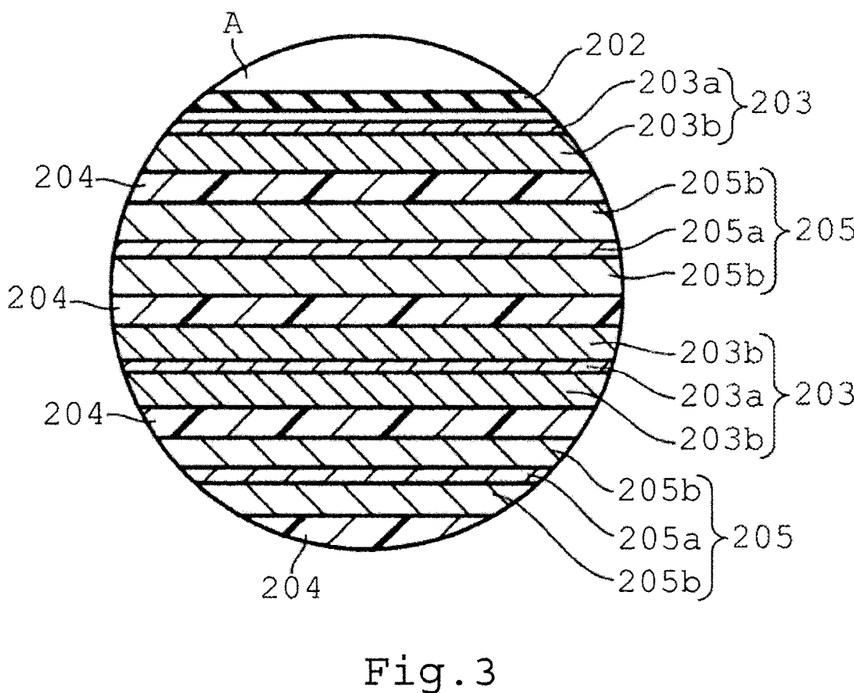
FIG. 3 is an enlarged conceptual view of the non-aqueous electrolytic secondary battery of the embodiment.

A more detailed description will be provided with reference to conceptual views of FIGS. 2 and 3 showing one example of a non-aqueous electrolytic secondary battery 200 according to the embodiment. FIG. 2 is a sectional conceptual view of the flat non-aqueous electrolytic secondary battery 200 with a bag-like exterior member 202 made of a laminate film, and FIG. 3 is an enlarged sectional view of a part A of FIG. 2. It is to be noted that each view is a conceptual view for the description, and a shape, a size, a ratio or the like of each of some places is different from in an actual device, but design of these can be changed as appropriate in view of the following description and known techniques.

A flat wound electrode group 201 is housed in the bag-like exterior member 202 made of a laminate film with aluminum foil placed between two resin layers. The flat wound electrode group 201 is formed by spirally winding up a laminate formed by laminating a negative electrode 203, a separator 204, a positive electrode 205 and a separator 204 in this order from the outside, and press-molding it. As shown in FIG. 3, the negative electrode 203 of the outermost shell has a configuration where a negative electrode mixture 203b is formed on one inner surface of the negative electrode current collector 203a. Other negative electrodes 203 are configured by forming the negative electrode mixture 203b on each surface of the negative electrode current collector 203a. The active material in the negative electrode mixture 203b includes a battery active material 200 according to the second embodiment. The positive electrode 205 is configured by forming a positive electrode mixture 205b on each surface of a positive electrode current collector 205a.

In the vicinity of the outer peripheral end of the wound electrode group 201, a negative electrode terminal 206 is electrically connected to the negative electrode current collector 203a of the negative electrode 203 of the outermost shell, and a positive electrode terminal 207 is electrically connected to the positive electrode current collector 205a of the internal positive electrode 205. The negative electrode terminal 206 and the positive electrode terminal 207 protrude outside from an opening of the bag-like exterior member 202. For example, a liquid non-aqueous electrolyte is poured from the opening of the bag-like exterior member 202. Performing heat sealing with the opening of the bag-like exterior member 202 placed between the negative electrode terminal 206 and the positive electrode terminal 207 can seal the wound electrode group 201 and the liquid non-aqueous electrolyte.

Examples of the negative electrode terminal 206 include aluminum and aluminum alloys containing elements such as Mg, Ti, Zn, Mn, Fe, Cu and Si. The negative electrode terminal 206 is preferably the same material as the negative electrode current collector 203a so as to reduce contact resistance with the negative electrode current collector 203a.

For the positive electrode terminal 207, there can be used a material provided with electric stability and conductivity in a range of a potential of 3 V to 4.25 V with respect to lithium ion metal. Specific examples thereof include aluminum and aluminum alloys containing elements such as Mg, Ti, Zn, Mn, Fe, Cu and Si. The positive electrode terminal 207 is preferably the same material as the positive electrode current collector 205a so as to reduce contact resistance with the positive electrode current collector 205a.

Hereinafter, the bag-like exterior member 202, the positive electrode 205, the negative electrode 203, the electrolyte and the separator 204 as constitutional members of the non-aqueous electrolytic secondary battery 200 will be described in detail.

1) Bag-like Exterior Member 202

The bag-like exterior member 202 is formed, for example, of a laminate film with a thickness of not larger than 0.5 mm. Alternatively, a metal container with a thickness of not larger than 1.0 mm may be used for the exterior member. The metal container preferably has a thickness of not larger than 0.5 mm.

The shape of the bag-like exterior member 202 can be selected from a flat shape (thin shape), a rectangular shape, a cylindrical shape, a coin shape and a button shape. Examples of the exterior member include a small-sized battery exterior member that is installed in mobile electronic equipment and the like, and a large-sized battery exterior member that is installed in an automobile with two-wheel or four-wheel drive and the like.

As the laminate film, a multilayered film with a metal layer placed between resin layers is used. The metal layer is preferably aluminum foil or aluminum alloy foil for the sake of weight saving. As the resin layer, for example, there can be used a high polymer material such as polypropylene (PP), polyethylene (PE), nylon or polyethylene terephthalate (PET). The laminate film can be molded in the shape of the exterior member by being sealed by heat fusion.

The metal container is made of aluminum, an aluminum alloy or the like. As the aluminum alloy, an alloy containing an element such as magnesium, zinc or silicon is preferable. When a transition metal such as iron, copper, nickel or chrome is contained in the alloy, an amount thereof is preferably made not larger than 100 mass ppm.

2) Positive Electrode 205

The positive electrode 205 has a structure where the positive electrode mixture 205b containing the active material is supported on one surface or each surface of the positive electrode current collector 205a.

The thickness of the positive electrode mixture 205b on one surface is desirably not smaller than 1.0 μm and not larger than 150 μm in terms of retaining the large current discharge characteristic and the cycle life of the battery. Therefore, when the positive electrode mixture 205b is held on each surface of the positive electrode current collector 205a, a total thickness thereof is desirably in a range of not smaller than 20 μm and not larger than 200 μm. A preferable range for the thickness thereof on one surface is not smaller than 20 μm and not larger than 120 μm. When it is in this range, the large current discharge characteristic and the cycle life are improved.

The positive electrode mixture 205b may contain the conductive agent other than the positive electrode active material.

Further, the positive electrode mixture 205b may contain the binder for binding the positive electrodes to each other.

As the positive electrode active material, it is preferable to use a variety of oxides such as manganese dioxide, lithium-manganese composite oxide, lithium-containing nickel cobalt oxide (e.g., $LiCOO_2$), lithium-containing nickel cobalt oxide (e.g., $LiNi_{0.8}CO_{0.2}O_2$) or lithium-manganese composite oxide (e.g., $LiMn_2O_4$, $LiMnO_2$) since a high voltage can be obtained.

Examples of the conductive agent may include acetylene black, carbon black and graphite.

As specific examples of the binder, for example, there can be used polytetrafluoroethylene (PTFE), polyvinylidene difluoride (PVdF), an ethylene-propylene-diene copolymer (EPDM), styrene-butadiene rubber (SBR) and the like.

A preferable blending ratio of the active material, the conductive agent and the binder in the positive electrode mixture 205b is: the active material being in a range of not less than 80 mass % and not more than 95 mass %; the conductive agent being in a range of not less than 3 mass % and not more than 18 mass %; and the binder being in a range of not less than 2 mass % and not more than 7 mass %. These ranges are preferable because favorable large current discharge characteristic and cycle life can be obtained.

As the current collector 205a, there can be used a conductive substrate with a porous structure or a nonporous conductive substrate. A thickness of the current collector 205a is desirably from not smaller than 5 μm and not larger than 20 μm. This is because, with this range, the balance between the electrode strength and weight saving can be taken.

The positive electrode 205 is produced, for example, by suspending the active material, the conductive agent and the binder in a general-purpose solvent to prepare slurry, applying this slurry to the current collector 205a, drying it and then exerting a press on it. The positive electrode 205 may also be produced by forming the active material, the conductive agent and the binder in a pellet form to serve as the positive electrode mixture 205b and forming this on the current collector 205a.

A preferable blending ratio of the active material, the conductive agent and the binder in the positive electrode mixture is: the active material being in a range of not less than 80 mass % and not more than 95 mass %; the conductive agent being in a range of not less than 3 mass % and not more than 18 mass %; and the binder being in a range of not less than 2 mass % and not more than 7 mass % because a favorable large current discharge characteristic and cycle life can be obtained.

3) Negative Electrode 203

The negative electrode 100 of the first embodiment is used as the negative electrode 203.

The negative electrode 203 has a structure in which the negative electrode mixture 203b containing the negative electrode active material and other negative electrode materials is supported in a layered form on one surface or each surface of the negative electrode current collector 203a.

Examples of a method for producing the negative electrode 203 of the embodiment include a method of applying two kinds of slurries with different concentrations of the binder to the current collector 203a and compression-molding thereof. Preparing an electrode by this method can give a negative electrode having the characteristic of a/b>1. As for the binder concentration, specifically, the binder concentration in the first slurry to be applied to the current collector is made high, and the binder concentration in the second slurry to be applied is made low. The binder concentration of the first slurry is preferably not less than 1.5 times and not more than 5 times as high as the binder concentration of the second slurry. When the concentration is less than 1.5 times as high, an effect exerted on the difference in binder concentration distribution is small. Further, when the binder concentration of the first slurry is excessively high, the charge and discharge capacity is reduced. It is to be noted that the binder concentration in a solid content of the second slurry is preferably not less than 1.0 mass % and not more than 20.0 mass %, for example. (A thickness of the first applied slurry)/(a thickness of the second applied slurry) is preferably not smaller than 0.01 and not larger than 0.1, for example. When the ratio of the first applied slurry is excessively small, the non-uniformity increases to result in variations in binding strength to the current collector within the electrode, which may exert an adverse effect on the rate characteristic and is thus not preferable. Further, when the ratio of the second applied slurry is excessively small, film resistance increases, which is not preferable. Compression-molding is performed after the second slurry application. This compression-molding is performed by means of a roll press having compression force of not smaller than 1.0 kN/cm, or the like.

The examples of the method for producing the negative electrode 203 of the embodiment include a method of applying slurry to the current collector 203a and thereafter molding the slurry with specific pressure. Pressing is preferably rolling-roll pressing. Linear pressure of the roll press is preferably not smaller than 0.2 kN/cm and not larger than 5.0 kN/cm. When pressing is performed with pressure lower than 0.2 kN/cm, a film density decreases, and it is thus not preferable from the viewpoint of a low volume density. Further, when pressing is performed with pressure higher than 5.0 kN/cm, it is not preferable from the viewpoint of causing damage on the negative electrode mixture to reduce the electrode strength. Although the electrode pressing is normally performed with pressure of not smaller than 0.5 kN/cm and not larger than 4.0 kN/cm, the above range is used in the embodiment. Performing roll pressing in such a range gives the advantage of being able to obtain an electrode with a/b>1.

The examples of the method for producing the negative electrode 203 of the embodiment include a method of performing chemical treatment on the current collector 203a. By modifying the current collector 203a with a compound having a good affinity with the binder, the affinity of the current collector 203a with the binder is enhanced to control the binder concentration distribution in the negative electrode 203.

4) Electrolyte

As the electrolyte, a non-aqueous electrolyte, an electrolyte impregnated-type polymer electrolyte, or an inorganic solid electrolyte can be used.

The non-aqueous electrolyte is a liquid electrolyte prepared by dissolving an electrolyte in a non-aqueous solvent, and is retained in a space in an electrode group.

As the non-aqueous solvent, it is preferable to use a non-aqueous solvent mostly containing a mixed solvent of propylene carbonate (PC), ethylene carbonate (EC) and a non-aqueous solvent (hereinafter referred to as second solvent) having a lower viscosity than those of PC and EC.

As the second solvent, for example, chain carbon is preferable, and examples thereof include dimethyl carbonate (DMC), methylethyl carbonate (MEC), diethyl carbonate (DEC), ethyl propionate, methyl propionate, γ-butyrolactone (BL), acetonitrile (AN), ethyl acetate (EA), toluene, xylene and methyl acetate (MA). These second solvents can be used singly or in the form of a mixture of two or more of them. Especially, the number of donors in the second solvent is preferably not larger than 16.5.

The viscosity of the second solvent is preferably not larger than 2.8 cmp at 25° C. A blending amount of ethylene carbonate or propylene carbonate in the mixed solvent is preferably not less than 1.0% and not more than 80% in a volume ratio. A more preferable blending amount of ethylene carbonate or propylene carbonate is not less than 20% and not more than 75% in a volume ratio.

Examples of the electrolyte contained in the non-aqueous electrolyte include lithium salts (electrolytes) such as lithium perchlorate ($LiClO_4$), lithium hexafluorophosphate ($LiPF_6$), lithium borofluoride ($LiBF_4$), lithium hexafluoroarsenate ($LiAsF_6$), lithium trifluoromethanesulfonate (LiCF$_3$SO$_3$), and lithium bis(trifluoromethanesulphonyl)imide [LiN(CF$_3$SO$_2$)$_2$]. Among them, LiPF$_6$ and LiBF$_4$ are preferably used.

A dissolved amount of the electrolyte with respect to the non-aqueous solvent is desirably not less than 0.5 mol/l and not more than 2.0 mol/l.

5) Separator 204

In the case of using the non-aqueous electrolyte and in the case of using the electrolyte impregnated-type polymer electrolyte, the separator 204 can be used. A porous separator is used as the separator 204. As a material for the separator 204, for example, there can be used a porous film containing polyethylene, polypropylene or polyvinylidene difluoride (PVdF), a synthetic resin-made nonwoven fabric, or the like. Among them, the porous film made of polyethylene or polypropylene, or made of both of them, is preferable since being capable of improving the safety of the secondary battery.

A thickness of the separator 204 is preferably made not larger than 30 µm. When the thickness exceeds 30 µm, a distance between the positive electrode and the negative electrode becomes longer and may cause an increase in internal resistance. Further, a lower limit of the thickness is preferably set to 5 µm. When the thickness is made smaller than 5 µm, the strength of the separator 204 may significantly decrease to make an internal short circuit easy to occur. An upper limit of the thickness is more preferably set to 25 µm, and a lower limit thereof is more preferably set to 1.0 µm.

A heat shrinkage of the separator 204 is preferably not more than 20% when it is made to stand for an hour on the condition of 120° C. When the heat shrinkage exceeds 20%, the possibility for occurrence of a short circuit due to heating increases. The heat shrinkage is preferably made not more than 15%.

A porosity of the separator 204 is preferably in a range of not less than 30% and not more than 70%. This is due to a reason as follows. When the porosity is made less than 30%, it may become difficult to obtain high electrolyte retention in the separator 204. On the other hand, when the porosity exceeds 70%, sufficient strength of the separator 204 may not be obtained. A more preferable range of the porosity is not less than 35% and not more than 60%.

An air permeability of the separator 204 is preferably not more than 500 sec/100 cm$^3$. When the air permeability exceeds 500 sec/100 cm$^3$, it may become difficult to obtain high lithium ion mobility in the separator 204. Further, a lower limit of the air permeability is 30 sec/100 cm$^3$. When the air permeability is made less than 30 sec/100 cm$^3$, sufficient strength of the separator may not be obtained. An upper limit of the air permeability is more preferably set to 300 sec/100 cm$^3$, and a lower limit thereof is more preferably set to 50 sec/100 cm$^3$.

(Third Embodiment)

Next, a battery pack using the foregoing non-aqueous electrolytic secondary battery will be described.

The battery pack according to the embodiment has one non-aqueous electrolytic secondary battery (i.e., single battery) or more according to the above embodiment. When a plurality of single batteries are included in the battery pack, each single battery is disposed as electrically connected in series, in parallel, or in series and parallel.

The battery pack 300 will be specifically described with reference to a conceptual view of FIG. 4 and a block diagram of FIG. 5. In the battery pack 300 shown in FIG. 4 uses the flat non-aqueous electrolyte battery 200 shown in FIG. 2 as a single battery 301.

The plurality of single batteries 301 are laminated such that a negative electrode terminal 302 and a positive electrode terminal 303 protruding outside are arranged in the same direction, and fastened by an adhesive tape 304, to constitute an assembled battery 305. These single batteries 301 are electrically connected with each other in series as shown in FIG. 5.

A printed circuit board 306 is disposed as opposed to the side surface of the single batteries 301 where the negative electrode terminal 302 and the positive electrode terminal 303 protrude. As shown in FIG. 5, the printed circuit board 306 is mounted with a thermistor 307, a protective circuit 308 and a terminal 309 for energization to external equipment. It is to be noted that an insulating plate (not shown) is fitted to the surface of the printed circuit board 306 opposed to the assembled battery 305 in order to avoid unnecessary connection with wiring of the assembled battery 305.

A positive electrode-side lead 310 is connected to the positive electrode terminal 303 located on the lowest layer of the assembled battery 305, and the tip thereof is inserted into a positive electrode-side connector 311 of the printed circuit board 306 and electrically connected. A negative electrode-side lead 312 is connected to the negative electrode terminal 302 located on the highest layer of the assembled battery 305, and the tip thereof is inserted into a negative electrode-side connector 313 of the printed circuit board 306 and electrically connected. These connectors 311, 313 are connected to the protective circuit 308 through wirings 314, 315 formed on the printed circuit board 306.

The thermistor 307 is used for detecting a temperature of the single battery 305, and a detection signal thereof is transmitted to the protective circuit 308. The protective circuit 308 can block plus-side wiring 316a and minus-side wiring 316b between the protective circuit 308 and the terminal 309 for energization to the external equipment on predetermined conditions. The predetermined condition is that, for example, it is performed when the detected temperature of the thermistor 307 is a predetermined temperature or higher. Further, the predetermined condition is that it is performed when overcharge, overdischarge, overcurrent or the like of the single battery 301 is detected. This detection of overcharge, overdischarge and the like is performed on the individual single battery 301 or the whole single batteries 301. When each of the individual single batteries 301 is to be detected, a battery voltage may be detected or a positive electrode potential or a negative electrode potential may be detected. In the latter case, a lithium electrode to be used as a reference electrode is inserted into each of the individual single batteries 301. In the case of FIGS. 4 and 5, wiring 317 for voltage detection is connected to each single battery 301, and a detection signal is transmitted to the protective circuit 308 through the wiring 317.

On each of three side surfaces of the assembled battery 305 except for the side surface where the positive electrode terminal 303 and the negative electrode terminal 302 protrude, a protective sheet 318 made of rubber or a resin is disposed.

the assembled battery 305 is housed into a package 319 along with each protective sheet 318 and the printed circuit board 306. That is, the protective sheets 318 are respectively disposed on both inner side surfaces in the long-side direction of the container 319 and on the inner surface in a short-side direction thereof, and the printed circuit board 306 is disposed on the opposite-side inner side surface in the short-side direction. The assembled battery 305 is located within a space surrounded by the protective sheets 318 and the printed circuit board 306. A lid 320 is fitted to the top surface of the container 319.

It is to be noted that, for fixing the assembled battery 305, a heat shrinkage tape may be used in place of the adhesive tape 304. In this case, the protective sheets are arranged on both side surface of the assembled battery, and the heat shrinkage tape is made to surround it and then shrunk by heat, to bind the assembled battery.

Figure 4:
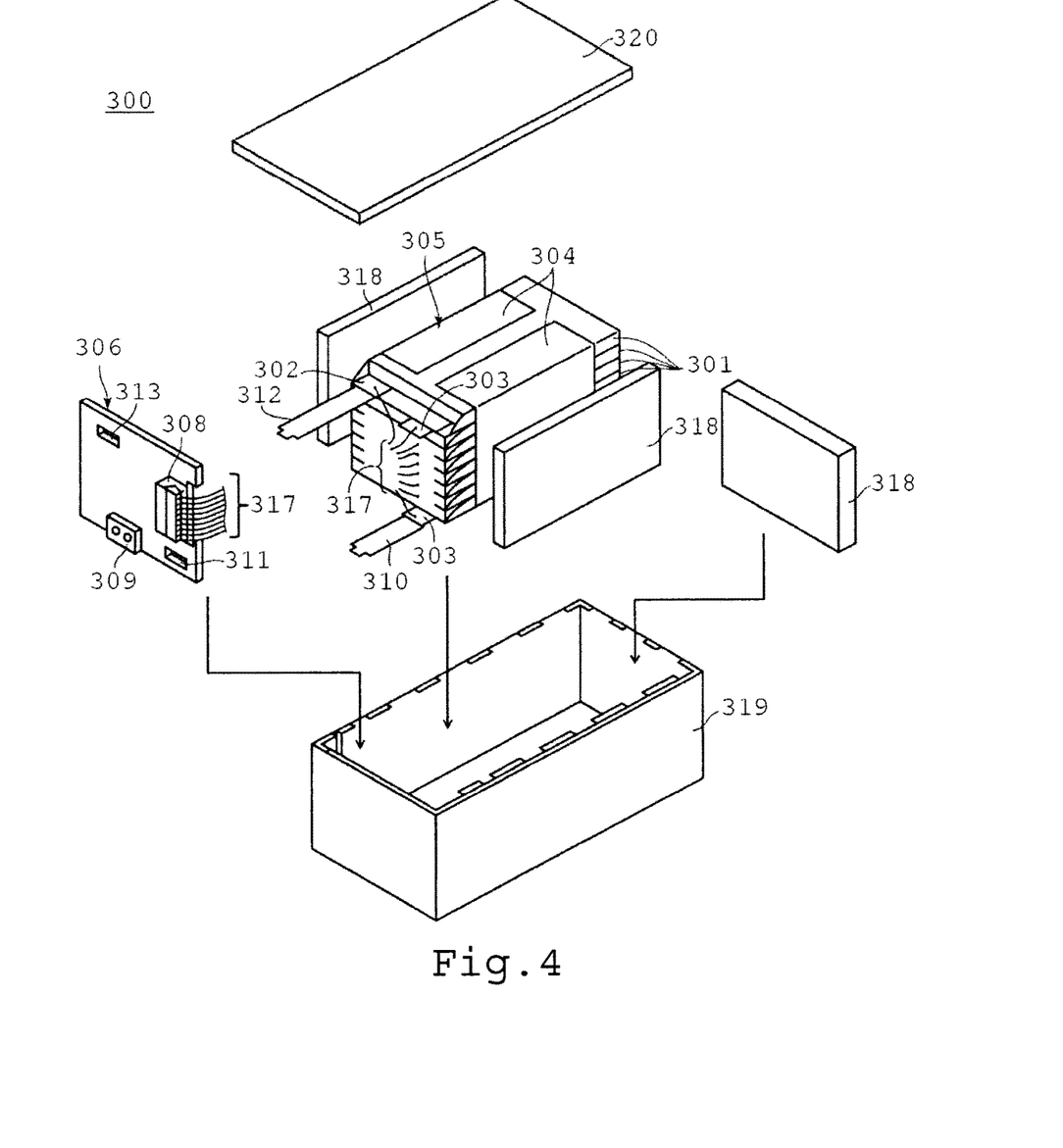
FIG. 4 is a conceptual view of a battery pack of the embodiment.
Figure 5:
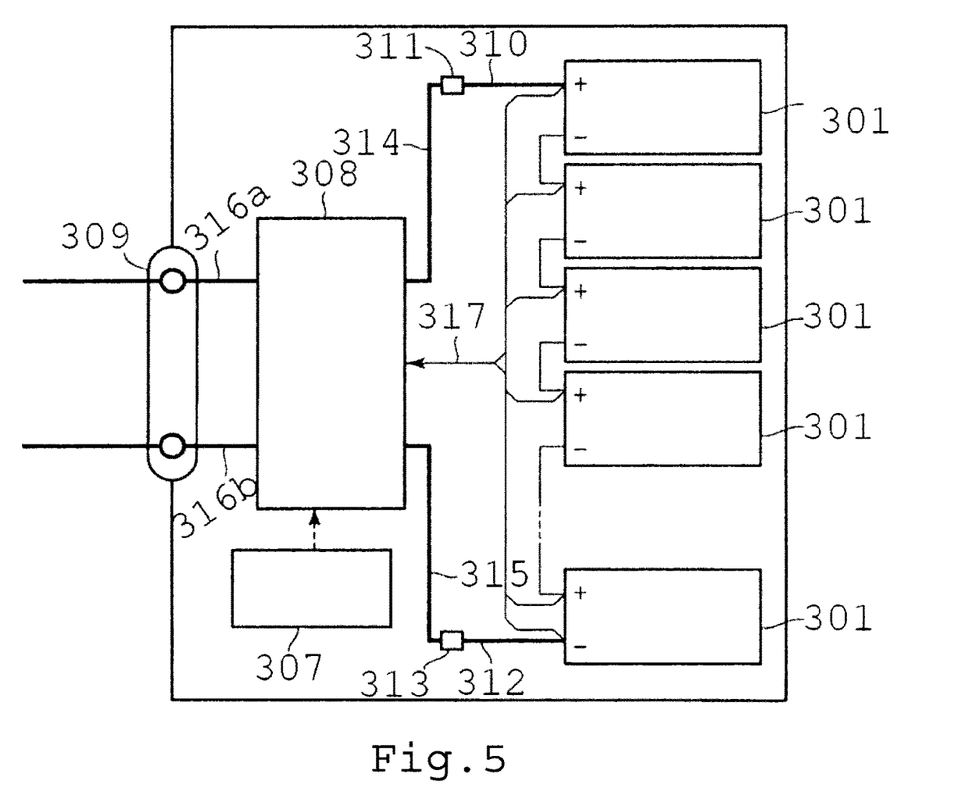
FIG. 5 is a block diagram showing an electric circuit of the battery pack of the embodiment.

The form has been shown in FIGS. 4 and 5 where the single batteries 301 are connected in series, and but in order to increase the battery capacity, they may be connected in parallel, or may be connected in series and parallel in combination. The assembled battery packs can further be connected in series or parallel.

According to the present embodiment described above, by including a non-aqueous electrolytic secondary battery having excellent charge and discharge cycle performance in the above embodiment, a battery pack having excellent charge and discharge cycle performance can be provided.

It is to be noted that an aspect of the battery pack is changed as appropriate according to the use thereof. The use of the battery pack is preferably one requiring a small size and a large capacity. Specific examples thereof include ones for power sources of a smart phone and a digital camera, and ones for mounting in a hybrid electric automobile with two-wheel or four-wheel drive, an electric automobile with two-wheel or four-wheel drive, an assist automobile and the like.

Hereinafter, specific examples will be cited and effects thereof will be described. However, these examples are not restrictive.

EXAMPLE 1

Artificial graphite (meso carbon micro beads: MCMB) with an average particle diameter of about 10 μm was used as a negative electrode active material, styrene-butadiene rubber (SBR) was used as a binder, and carboxymethylcellulose (CMC) was used as a viscosity adjusting agent in an equal amount to SBR. First, as a solid content, 90 mass % of graphite and 10 mass % of the binder composite were made into slurry such that a solid content concentration was 50 mass %, and the slurry was applied to a negative electrode current collector so as to have a thickness of about 15 μm after drying, followed by drying and compression-molding. Further, slurry, obtained by adjusting 97.5 mass % of graphite and 2.5 mass % of the binder composite such that a solid content concentration was 50 mass % in distilled water, was additionally applied, followed by drying and compression-molding with 2.0 kN/cm, to produce a negative electrode with a total thickness of 70 μm.

The produced electrode was cut into 20 mm square each, to be an evaluation sample for cutting strength. Each of the cutting strength a, b of the evaluation sample was measured by the foregoing measuring method by means of a cutting strength measuring device SAICAS (trademark) DN-GS type (manufactured by DAYPLA WINTES CO., LTD). A ceramic blade made of a borazon material was used as a cutting blade, and one made of ceramic and having a blade width of 1.0 mm was used. The measurement was performed at a rake angle of 20 degrees and a clearance angle of 10 degrees as blade angles at a constant speed of 2 μm/sec. The measurement was performed at a measurement temperature of a room temperature (25° C.), with a sample temperature also being the room temperature (25° C.). The cutting strength a was measured on a constant load mode of 0.5 N. Results are shown in Table 1.

As for the cycle characteristic, after this negative electrode was cut into a predetermined size, it was vacuum-dried at 100° C. for 12 hours, to be a test electrode. A battery, where a counter electrode and a reference electrode were metal Li and an electrolyte was an EC.DEC (volume ratio; EC:DEC=1:2) solution of $LiPF_6$ (1 M), was produced in an argon atmosphere and subjected to a charge and discharge test. Conditions for the charge and discharge test were as follows: charge was performed with a current density of 1 $mA/cm^2$ until a potential difference between the reference electrode and the test electrode became 0.01 V; constant-voltage charge was further performed for 16 hours with the potential difference being 0.01 V; and discharge was performed with a current density of 1 $mA/cm^2$ until the potential difference became 1.5 V. Moreover, the cycle of performing the charge with a current density of 1 $mA/cm^2$ until the potential difference between the reference electrode and the test electrode of 0.01 V and performing the discharge with a current density of 1 $mA/cm^2$ until the potential difference of 1.5 V was repeated 100 times, and a maintenance factor of a discharge capacity in the 100th cycle with respect to that in the first cycle was measured. These discharge capacity characteristics were put together in Table 2.

In the following examples and comparative examples, only different parts from Example 1 will be described, and the other composition and evaluation orders are the same as those in Example 1, and will thus be omitted.

EXAMPLE 2

A carbon complex having a Si phase and a silicon oxide phase was used as the negative electrode active material.

SiO was pulverized as follows. A pulverization treatment was performed on a raw material SiO powder with ethanol used as a dispersion medium in a continuous bead mill device by use of beads with a bead diameter of 0.5 μm for predetermined time. Further, this SiO powder was pulverized with ethanol used as a dispersion medium in a planetary ball mill by use of a 0.1 μm ball, to produce a SiO fine powder.

A silicon monoxide powder obtained by the pulverization treatment and a 6 μm graphite powder were made to compound with hard carbon by a manner as follows. A mixed solution of 4.0 g furfuryl alcohol, 10 g ethanol and 0.125 g water was added with a 2.8 g SiO powder, a 0.7 g graphite powder and a 0.06 g carbon fiber with an average diameter of 180 nm, which was then subjected to a kneading treatment in a kneading machine, to be formed into slurry. The slurry after the kneading was added with 0.2 g dilute hydrochloric acid to be a polymerization catalyst of furfuryl alcohol, which was made to stand still at a room temperature, and dried and solidified, to obtain a carbon complex.

The obtained carbon complex was sintered in an Ar gas at 1050° C. for three hours and cooled down to the room temperature, which was then pulverized and put through a sieve with a diameter of 45 μm, to obtain a negative electrode active material. A mixture slurry, obtained by kneading the obtained sample with 15 mass % of graphite having an average diameter of 6 μm and 8 mass % of polyamic acid composite (polyamic acid composite obtained by mixing A:B=1:1 mass ratio, where polyamic acid A with pyromellitic acid anhydride and oxydianiline taken as constitutional units and polyamic acid B with solubility of 45 mass % of N-methylpyrrolidone (NMP) containing a benzophenonetetracarboxylic acid/meta-phenylenediamine compound) with N-methylpyrrolidone used as a dispersion medium, was applied onto current collector copper foil. The sample was rolled by a rolling roll with a load of 1.0 kN/cm, and thereafter subjected to heat treatment in an Ar gas at 250° C. for two hours, to produce a negative electrode.

EXAMPLE 3

In order to remove a surface oxidation film of electrolytic copper foil without surface treatment, the copper foil was soaked in a 10% hydrochloric acid aqueous solution for 60 seconds. In order to remove the adherent acid, it was sufficiently dried with ion exchanged water, and sprayed with compressed nitrogen to be dried. After a treatment solution obtained by dissolving 50 mg of 5-amino-1H-tetrazol in 1 L of ethanol was uniformly sprayed onto the copper foil as thus treated, compressed nitrogen was sprayed, to dry the surface. Subsequently, in order to clean excess 2-aminobenzimidazole adherent to the copper foil surface, this copper foil was soaked in methanol for 60 seconds and then sprayed with compressed nitrogen to dry the surface, whereby surface treated copper foil was obtained and this was used as a current collector. It is to be noted that, when the surface-treated copper foil surface was evaluated at an arbitrary number of points by ATR method, a peak derived from an amino group was observed in the vicinity of 3400 cm$^{-1}$, and it was confirmed that the 2-aminobenzimidazole treatment had been done as expected.

A negative electrode was produced using the active material and the current collector obtained in Example 3, and a charge and discharge test that will be described below, a charge and discharge test by means of the cylindrical battery cell (FIG. 2) and an X-ray diffraction measurement were performed, to evaluate charge and discharge characteristics and physical properties.

EXAMPLE 4

A powder, obtained by pulverizing massive Sn in an Ar atmosphere in a jet mill, was further pulverized into a submicron diameter in ethanol in a wet planetary mill. The Sn fine powder was isolated in the Ar atmosphere and inserted into a sucrose aqueous solution, which was then added with 1 N of dilute sulfuric acid and carbon-coated in an atmosphere at 60° C. The powder was cleaned with a hydrogen sodium carbonate aqueous solution until a pH of the cleaning solution becomes 7, and then vacuum-dried at 100° C., to obtain a carbon-coated Sn powder. A mixture slurry, obtained by kneading the obtained sample with 15 mass % of graphite having an average diameter of 6 µm and 8 mass % of polyamic acid composite (polyamic acid composite obtained by mixing A:B=1:1 mass ratio, where polyamic acid A with pyromellitic acid anhydride and oxydianiline taken as constitutional units and polyamic acid B with solubility of 45 mass % of NMP containing a benzophenonetetracarboxylic acid/meta-phenylenediamine compound) with N-methylpyrrolidone used as a dispersion medium, was applied onto current collector copper foil. The sample was rolled by a rolling roll with a load of 1.0 kN/cm, and thereafter subjected to heat treatment in an Ar gas at 200° C. for 12 hours, to produce a negative electrode.

EXAMPLE 5

The same mixture slurry as in Example 2 was applied onto the current collector copper foil. It was rolled by a rolling roll with a load of 4.0 kN/cm, and thereafter subjected to heat treatment in an Ar gas at 250° C. for two hours, to produce a negative electrode.

EXAMPLE 6

A mixture slurry, obtained by kneading the same negative electrode as that of Example 2 with 15 mass % of graphite having an average diameter of 6 µm and 16 mass % of polyamic acid composite (polyamic acid composite obtained by mixing A:B=1:1 mass ratio, where polyamic acid A with pyromellitic acid anhydride and oxydianiline taken as constitutional units and polyamic acid B with solubility of 45 mass % of NMP composed of a benzophenonetetracarboxylic acid/meta-phenylenediamine compound) with N-methyl pyrrolidone used as a dispersion medium, was applied onto current collector copper foil so as to have a thickness of 10 µm, which was then dried and compression-molded. Further, a mixture slurry, obtained by kneading 15 mass % of graphite having an average diameter of 6 µm and 6 mass % of polyamic acid composite with N-methylpyrrolidone used as a dispersion medium, was additionally applied and dried. This was compression-molded by a rolling roll with a load of 1.0 kN/cm and a negative electrode with a total thickness of 70 µm was thereby produced and then rolled, whereafter it was subjected to heat treatment in an Ar gas at 250° C. for two hours, to produce a negative electrode.

COMPARATIVE EXAMPLE 1

Using artificial graphite MCMB with an average particle diameter of about 10 µm as a negative electrode active material and PVDF as a binder, slurry, obtained by adjusting 98.5 mass % of graphite and 1.5 mass % of the binder composite such that a solid content concentration was 50 mass % in distilled water by use of N-methyl pyrrolidone, was additionally applied, followed by drying and compression-molding, to produce a negative electrode with a total thickness of 70 µm.

COMPARATIVE EXAMPLE 2

The same mixture slurry as in Example 2 was applied onto the current collector copper foil. It was rolled by a rolling roll with a load of 6.0 kN/cm, and thereafter subjected to heat treatment in an Ar gas at 250° C. for two hours, to produce a negative electrode.

TABLE 1

|  | a [kN/m] | b [kN/m] | a/b [—] |
|---|---|---|---|
| Example 1 | 0.56 | 0.44 | 1.27 |
| Example 2 | 0.71 | 0.51 | 1.39 |
| Example 3 | 0.82 | 0.53 | 1.55 |
| Example 4 | 0.75 | 0.58 | 1.29 |
| Example 5 | 0.48 | 0.44 | 1.08 |
| Example 6 | 1.15 | 0.45 | 2.56 |
| Comparative Example 1 | 0.09 | 0.25 | 0.36 |
| Comparative Example 2 | 0.33 | 0.48 | 0.69 | a: cutting strength of interface of electrode mixture/current collector
b: cutting strength within electrode mixture

TABLE 2

|  | DISCHARGE CAPACITY [mAh/g] | CAPACITY MAINTENANCE FACTOR AFTER 100 CYCLES [%] |
|---|---|---|
| Example 1 | 338 | 96 |
| Example 2 | 834 | 92 |
| Example 3 | 846 | 93 |
| Example 4 | 785 | 93 |
| Example 5 | 838 | 87 |

From the results shown in Table 2, it is understood as to the negative electrode of the present aspect that, when the cutting strength of the interface between the current collector and the negative electrode mixture shown in Table 1 is represented by "a" and the cutting strength in an arbitrary horizontal direction within the negative electrode mixture is represented by "b", the use of the negative electrode with a>b gives a favorable cycle characteristic. The same also applies to the case of using an active material which has a large lithium occlusion capacity and makes a large change in volume accompanying charge and discharge. That is, in Comparative Examples 1 and 2, separation between the electrode mixture and the current collector occurred with the progress of charge and discharge, to cause deterioration in cycle characteristic. The effect significantly appeared especially by comparison between Example 2 and Comparative Example 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-aqueous electrolytic secondary battery, comprising:
an exterior member;
a positive electrode housed in the exterior member;
a separator housed in the exterior member;
a negative electrode containing an active material and housed in the exterior member as spatially separated from the positive electrode via the separator; and
a non-aqueous electrolyte with which the exterior member is filled,
wherein the negative electrode comprises:
a current collector: and
a negative electrode mixture containing a polymer having imide groups and an active material particle selected from at least one of a carbonaceous material, a metal particle and a metal oxide particle on the current collector,
when cutting strength of an interface between the current collector and the negative electrode mixture is represented by "a" and cutting strength in a horizontal direction within the negative electrode mixture is represented by "b", every "a" and every "b" satisfy a relation of a/b>1,
a ratio of the polymer having imide groups in the negative electrode mixture is in a range of not less than 2 mass % and not more than 7 mass %,
the cutting strength b is the cutting strength in a region half as large as an average thickness of the negative electrode mixture, and
the region half as large as the average thickness of the electrode mixture is a region within ±20% of the average thickness of the negative electrode mixture from the surface of the negative electrode mixture.

2. The battery according to claim 1, wherein the metal particle and the metal oxide particle include at least one of one or more selected elements which are selected from Si, Sn, Al, In, Ga, Pb, Ti, Ni, Mg, W, Mo and Fe, an alloy including one or more the selected elements, an oxide of one or more the selected elements, and an oxide including one or more the selected elements.

3. The battery according to claim 1, wherein every "a" and every "b" satisfy a relation of a/b>1.3.

4. The battery according to claim 1, wherein every "a" and every "b" satisfy a relation of a/b≤3.

5. The battery according to claim 1, wherein
the cutting strength a is cutting strength obtained by measuring the interface between the current collector and the negative electrode mixture on a condition that a constant load is applied vertically in a current collector direction, and
the cutting strength b is cutting strength obtained by measuring a constant depth region in the negative electrode mixture without applying the constant load.

6. A battery pack, comprising: one or more non-aqueous electrolytic secondary battery, wherein the secondary battery comprising:
an exterior member;
a positive electrode housed in the exterior member;
a separator housed in the exterior member;
a negative electrode containing an active material and housed in the exterior member as spatially separated from the positive electrode via the separator; and
a non-aqueous electrolyte with which the exterior member is filled,
wherein the negative electrode comprises:
a current collector; and
a negative electrode mixture containing a polymer having imide groups and an active material particle selected from at least one of a carbonaceous material, a metal particle and a metal oxide particle on the current collector,
when cutting strength of an interface between the current collector and the negative electrode mixture is represented by "a" and cutting strength in a horizontal direction within the negative electrode mixture is represented by "b", every "a" and every "b" satisfy a relation of a/b>1,
a ratio of the polymer having imide groups in the negative electrode mixture is in a range of not less than 2 mass % and not more than 7 mass %,
the cutting strength b is the cutting strength in a region half as large as an average thickness of the negative electrode mixture, and
the region half as large as the average thickness of the electrode mixture is a region within ±20% of the average thickness of the negative electrode mixture from the surface of the negative electrode mixture.

7. The battery pack according to claim 6, wherein the metal particle and the metal oxide particle include at least one of one or more selected elements which are selected from Si, Sn, Al, In, Ga, Pb, Ti, Ni, Mg, W, Mo and Fe, an alloy including one or more the selected elements, an oxide of one or more the selected elements, and an oxide including one or more the selected elements.

8. The battery pack according to claim 6, wherein every "a" and every "b" satisfy a relation of a/b>1.3.

9. The battery pack according to claim 6, wherein every "a" and every "b" satisfy a relation of a/b≤3.

10. The battery pack according to claim 6, wherein
the cutting strength "a" is cutting strength obtained by measuring the interface between the current collector and the negative electrode mixture on a condition that a constant load is applied vertically in a current collector direction, and
the cutting strength "b" is cutting strength obtained by measuring a constant depth region in the negative electrode mixture without applying the constant load.

11. The battery according to claim 1, wherein the metal particle includes Si, and the metal oxide particle includes $SiO_2$.

12. The battery pack according to claim 6, wherein the metal particle includes Si, and the metal oxide particle includes $SiO_2$.

13. The battery according to claim 1, wherein the separator consists of polyethylene, polypropylene, polyvinylidene fluoride, a synthetic resin-made nonwoven fabric, or both of polyethylene and polypropylene.

14. The battery pack according to claim 6, wherein the separator consists of polyethylene, polypropylene, polyvinylidene fluoride, a synthetic resin-made nonwoven fabric, or both of polyethylene and polypropylene.

* * * * *